L. E. JOHNSON ET AL
May 17, 1932. FUEL OIL BURNER Re. 18,464
Original Filed March 26, 1928 2 Sheets-Sheet 1
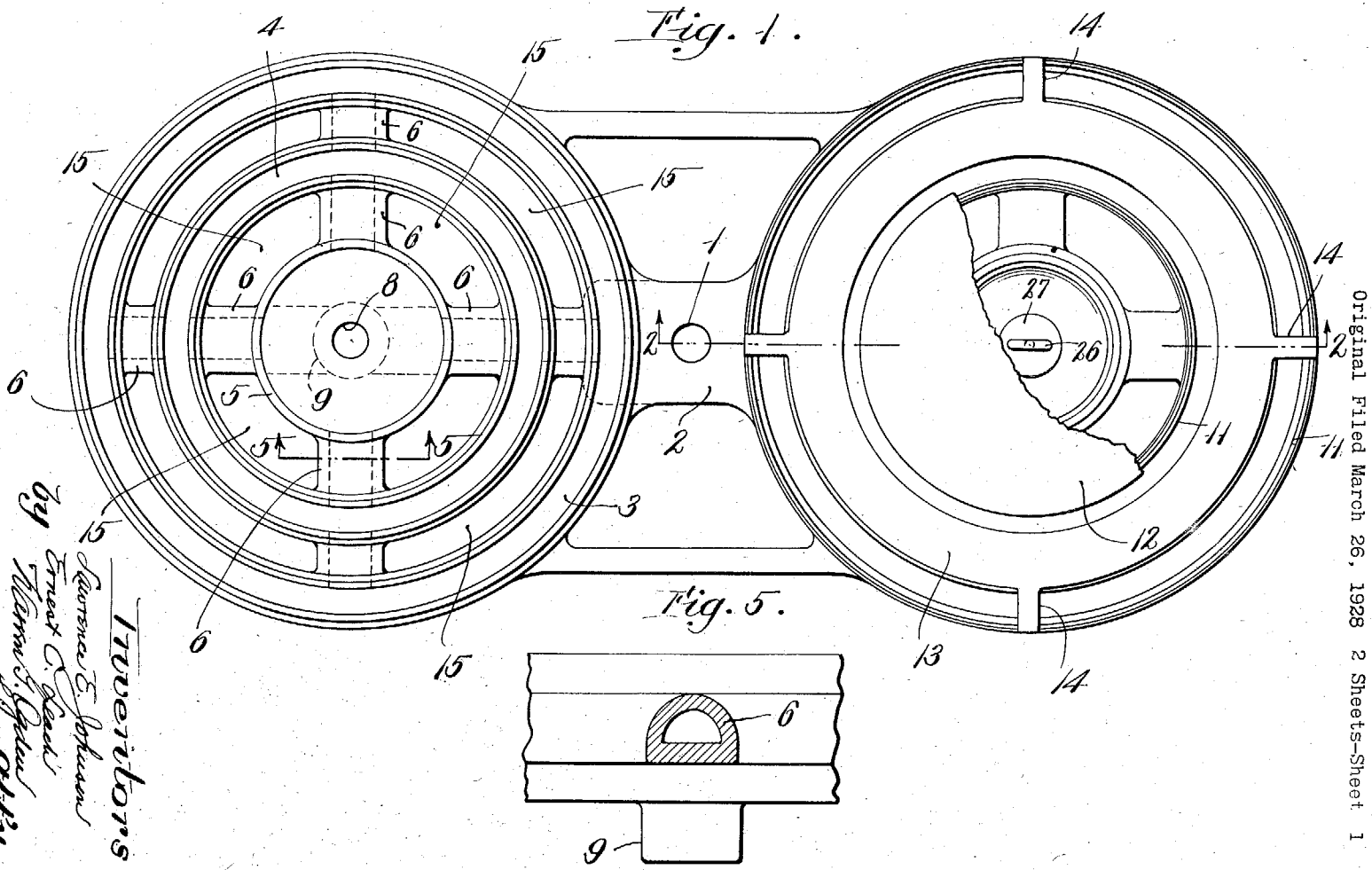
Inventors
Lawrence E. Johnson
Ernest C. Leach
By Warren G. Ogden
their Att'y.

L. E. JOHNSON ET AL

May 17, 1932. FUEL OIL BURNER Re. 18,464

Original Filed March 26, 1928 2 Sheets-Sheet 2

Inventors.
Lawrence E. Johnson
Ernest O. Beach
by William G. Egan Atty.

Reissued May 17, 1932

Re. 18,464

UNITED STATES PATENT OFFICE

LAWRENCE E. JOHNSON, OF MELROSE, AND ERNEST C. LEACH, OF WEST PEABODY, MASSACHUSETTS, ASSIGNORS TO LYNN PRODUCTS CO., OF LYNN, MASSACHUSETTS, A CORPORATION OF MASSACHUSETTS

FUEL OIL BURNER

Original No. 1,764,794, dated June 17, 1930, Serial No. 264,591, filed March 26, 1928. Application for reissue filed February 12, 1932. Serial No. 592,814.

The invention has relation to fuel oil burners, and in particular to fuel oil burners of the type adapted to be employed in connection with domestic stoves and ranges to provide heat for cooking and other household purposes.

Fuel oil burners of various kinds designed for installation in domestic ranges originally made for the combustion of wood or coal have long been known in the art. Of the various types of such devices one that has entered widely into use comprises a horizontally disposed circular groove, or a plurality of grooves arranged concentrically, each groove being provided with perforated sleeves one of which stands upon the outer lip and the other upon the inner lip of said groove. The liquid fuel is fed by gravity into the groove or grooves and ignited without the use of a wick, and after a short period of operation the metal of which the grooves are formed becomes heated sufficiently to vaporize the fuel as fast as it is fed thereto, and the resulting vapor rises and burns in the space between the pair of sleeves with an admixture of adequate atmospheric oxygen through the perforations to produce a very hot blue flame.

One limitation of the old construction is that the burner will not operate efficiently with fuel of heavier grade than kerosene, on account of the difficulty of maintaining a sufficient heat in the metal of the grooves, which lie below the flame-level and the level of the products of combustion, to produce sustained vaporization. Kerosene is of higher cost and poorer in heat-value than other slightly heavier petroleum derivatives, and in certain localities is of limited distribution and availability. Another limitation of the old burner is its relatively rapid fouling by the residues of combustion, and the disturbance to the proper operation of the flame caused by a relatively small amount of such residues. Other limitations include the difficulty of cleaning the burners, and the difficulty of lighting them.

An important feature of our novel and improved fuel-oil burner comprises the combination with a combustion chamber and a source of fuel supply, of a closed vaporizing chamber in which the fuel is vaporized and the volatile products allowed to pass on to the combustion chamber while the residues are retained. Further features comprise provision for facilitating the removal of such residues from the vaporizing chamber and the provision of improved means for priming the burner.

The illustrative embodiment of the invention is shown in the accompanying drawings, in which:—

Figure 1 is a plan view of a pair of burners embodying the invention, one with the lids in place and partly broken away to show the vaporizing chamber, and the other with lids, sleeves, and the removable part of the vaporizing chamber lifted off to show the arrangement of the base-portion;

Fig. 5 is a view, in vertical section, on line 5—5 of Fig. 1, showing the duct through which the vaporized fuel passes to the combustion chamber.

Figure 3:
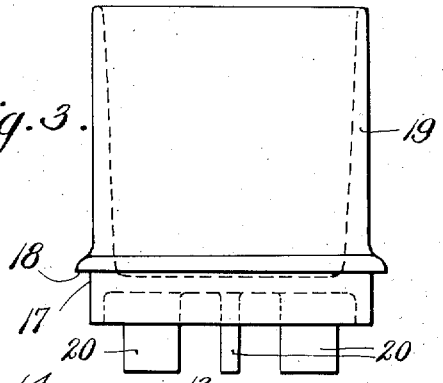
Fig. 3 is a view, in elevation.

Only such portions of a complete fuel oil burner organization of the old and well-known type are shown in the drawings as are necessary to an understanding of the present invention and its application. The general arrangement shown is a typical one designed to be installed in a domestic stove, or "range" as commonly built for the use of coal or wood as fuel, for the purpose of converting it for burning oil. The burners are arranged in pairs as shown in Fig. 1, supported in the fire-box by a standard (not shown) engaging at 1 with the web 2 uniting the two base-portions of the burners. The burners shown have each two vapor-distributing grooves 3, 4, concentric and horizontally disposed, and combined with each other and with a central cup 5, constituting a part of our invention, by suitably distributed radial tubular ribs 6, 6, 6, forming conduits or passages for distributing fuel from the central cup to the inner and outer grooves 3 and 4. Liquid fuel is fed into this novel central cup 5 in suitable manner, as through a feed-pipe 7 screwed into a threaded axial bore 8 formed in a boss 9 on the underside of the cup 5. The fuel may be fed into the cup by gravity from a source of supply which is below the level of the upper edge of the cup 5 or the lips 10 of the grooves 3 and 4, but above the bottom of the cup, so that the burners cannot overflow.

The usual perforated sleeves 11, 11, 11, are provided and applied respectively to the inner and outer lips 10 of each groove 3, 4, and stand as walls to define between each pair and the bottom of their proper groove an annular combustion chamber into which atmospheric oxygen is admitted through the many perforations in such manner as to mix with the rising vaporized fuel, or gas, and produce a completely combustible mixture burning with a very hot blue flame. Lids 12, circular, and 13, annular, are applied to the top of the sleeves to hold them steady and properly spaced apart, the annulus 13 being provided with lugs 14 at appropriate points to engage the outermost sleeve and hold it in spaced relation. The spaces 15, 15, 15, admit air from below to enter the perforations. The annular opening at the top of the combustion chamber defined by the inner pair of sleeves 11, 11, and their groove, is made slightly narrower by the outward extension of lid 12 and the inward extension of annulus 13, to insure an adequate supply of vaporized fuel reaching the outer combustion chamber.

In such burners hitherto in use, the oil is customarily admitted in liquid form directly into the grooves, where after the difficulty experienced in lighting it has been overcome the oil is vaporized by the heat of the metal in which the grooves are formed, derived from the flame propagated in the combustion chamber at all points above the lips of the grooves. This vaporization is a process which leaves behind it at its point of occurrence a residue even when the best grades of fuel suitable for this use are employed. This vaporization also occurs in prior forms in the supply ducts, and as this residue is very hard and tenacious in adhering to the metal, collects rapidly with all fuels except high-grade kerosene and must, in spite of the difficulty of so doing, be removed from the grooves and also from the ducts in order to secure efficient combustion, the most satisfactory operation has not been secured from prior devices.

In accordance with our invention, we provide a separate chamber for the complete vaporization of the fuel oil, to which substantially all the vaporizing and deposit of residue are confined, and from which such deposit may be easily and quickly removed, and supply the oil in such chamber with a greater degree of heat, to speed up the production of vapor of a hotter and more inflammable nature, to attain better combustion, and increase the efficiency of the burner.

Figure 4:
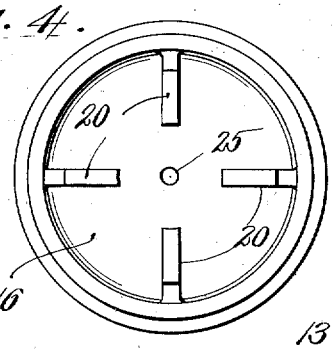
Fig. 4 a bottom view, of the heat-transmitting member forming the removable top of the vaporizing chamber.
Figure 2:
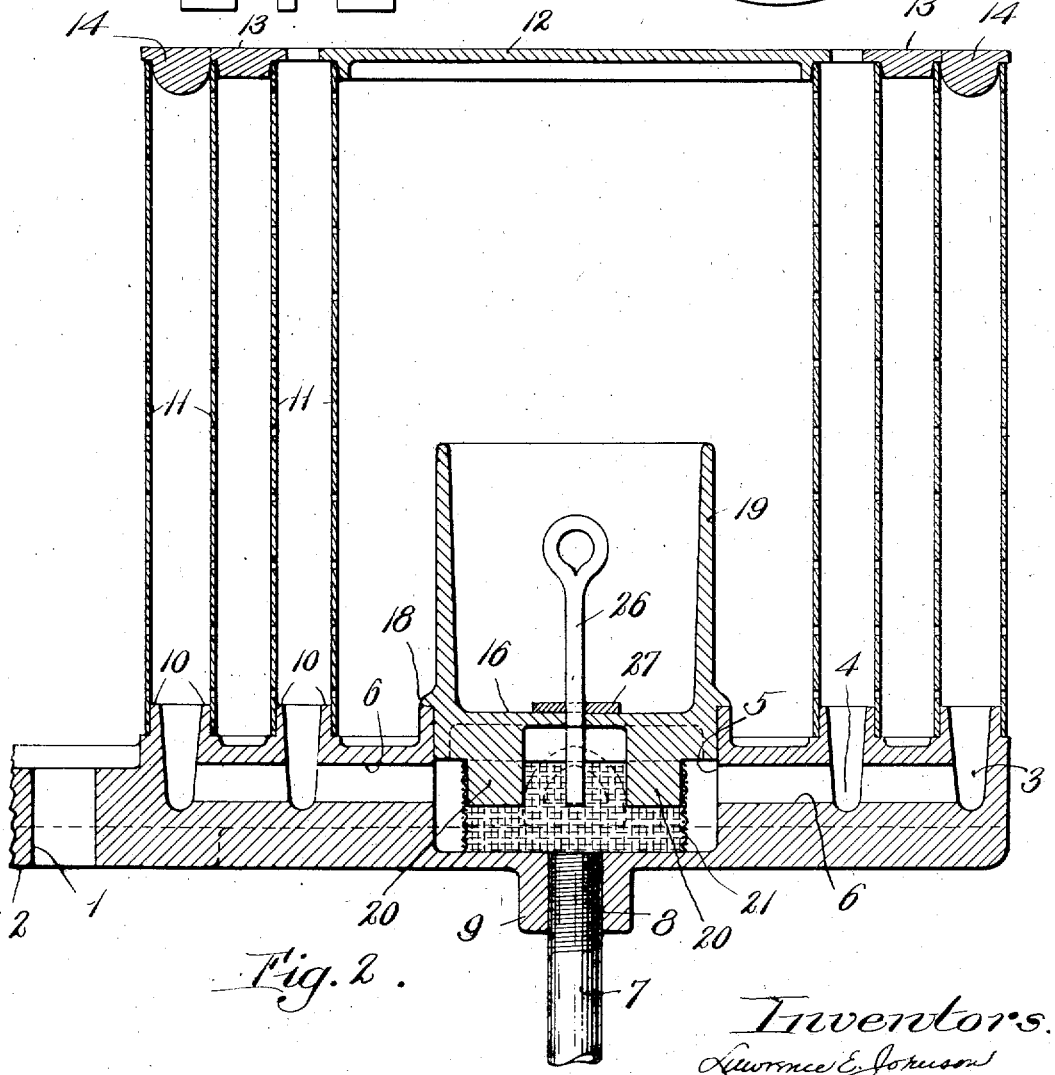
Fig. 2 is a view, in vertical section, of one complete burner, made on line 2—2 of Fig. 1.

This vaporizing chamber previously referred to as new in the combination of elements is formed within the central cup 5, which preferably has the internal shape of a solid of revolution, herein a cylinder, by the addition of a cover or top which may efficiently be in the shape of the novel heat-collecting and conducting member shown separately in Figs. 3 and 4, which is cup-shaped itself, with a bottom 16 having a depending rim 17 to enter the mouth of cup 5 and a flange 18 to fit gas-tight but removably upon the lip of cup 5. The cylindrical side-wall 19 is made as high as desired to collect the necessary amount of heat radiated from the adjacent inward surface of the inmost sleeve 11 which is red-hot when in use, and being preferably made of brass this heat flows rapidly throughout the cup and down a plurality of integrally-formed blades or fingers 20 projecting down within the cup from the bottom 16 and into the liquid fuel as it arrives at the burner from the feed-pipe 7 and wells up in the cup. The heat-conducting member also passes heat to the whole body of metal forming the cup 5, to complete the vaporization. Extending far above the level of the lowest point of flame propagation, the member is at a great advantage over the grooves themselves in the matter of acquiring heat, and through its heat-transmitting characteristic operates so efficiently that with proper adjustment of the oil-level nothing but dry vapor leaves the cup and passes through the ducts at atmospheric pressure to the grooves 3 and 4. It will be obvious that the original function of the grooves 3 and 4 has been done away with, and that they simply function as distributing passages for vaporized fuel, and any other method of distributing and mixing air with the vaporized fuel may be employed without departing from the scope of our invention; but the old structure has been illustrated herein because it operates in combination, and in order to make more emphatic the improvement in the efficiency of the burner and its freedom from choking up with residue. A band of wire cloth 21 (Fig. 2), which will act as a strainer for the incoming fuel, may be placed loosely within the vaporizing cup 5 so that it can readily be removed when the cover 19 of the cup is taken off to permit cleaning.

The organization shown and described herein vaporizes its fuel in a special chamber which is easily cleaned and also adequately supplied with heat. Through the novel arrangements provided, the said chamber is amply heated even though located below the level of the tops of the grooves 3, 4, so that the principle of feeding from a source lying below the level of said grooves but above the bottom thereof may be employed, to produce a device that will not flood or overflow and create a fire hazard. Hitherto this heating of a vaporizing chamber, when provided as a distinct part as herein, involved its location in the path of the flame, or hot products of combustion. In prior devices, to subject the vaporizing chamber to heating thus effected by convection, it has had to be placed in the path of the rising hot gases, and hence above the grooves, and the safety features of the "oil-level" principle could not be attained; or the hot gases were required to be diverted out of their normal upward course, and carried in a circuitous route downward to heat a chamber below the level of the tops of said grooves, with resulting delay in getting the heat to the desired point of application, such as the cooking utensils, etc., placed upon the range, and consequent loss of efficiency. In the improved construction, the products of combustion rise vertically and directly, and are applied to the utensil or other object at the moment when their temperature is highest. Further, either burner may be operated independently of the other, while oil is fed to both from the common feed-pipe, without any need for a separate shut-off for each.

In prior burners of this general type no provision was made for priming the burner preparatory to lighting it, and the procedure of starting up the burner involved turning on the fuel to flow into the grooves, and then striving to light the fuel therein with a thin torch capable of being inserted between the sleeves into the grooves. In the absence of wicks this has been no simple matter to effect with fuel oil and resort has been had to auxiliary burners, rings and pans to receive fuel oil, or more volatile fuel, positioned beneath the regular burners to heat the latter sufficiently to start them operating. Or alcohol, gasoline, and like highly inflammable liquids have been poured down as priming between the sleeves to enter the grooves, but not without considerable risk when afterwards ignited as the fuel thus dispensed floods many other parts as well as the grooves and can create an explosion hazard in the confinement of the fire-box of a range. It is not practicable to remove the sleeves to prime the burner.

The present invention provides a simple priming means which is safe and effective in use. The heat-transmitting member is provided with a central hole 25 through its bottom 16, preferably axially disposed. In this hole 25 fits loosely a short rod or plug 26 having a shoulder 27 formed thereon, or formed by an applied washer, to bear against the upper surface of bottom 16 and determine the extent of its downward projection into the cup 5. This rod 26 when axially located is aligned with the end of the feed-pipe 7. A priming liquid, such as gasoline or alcohol, may be poured into the cup-shaped upper portion of the heat-collecting member, after the circular lid 12 has been removed, and ignited to heat the said member and the cup 5 comprising the rest of the vaporizing chamber. While this priming fluid is burning, a certain portion seeps through the hole 25 and flows down the rod to drip into the feed pipe. When the burner is shut off after use and allowed to burn itself out, the contraction of the previously warmed fuel oil in the feed-pipe causes it to drop from one to two inches below the upper end of the feed-pipe, and the priming fluid occupies this space, mixing with the fuel oil standing in the pipe and rendering it easier to ignite. After the parts have become thoroughly heated, the feed pipe valve is opened to permit the fuel in the feed-pipe to enter the vaporizing chamber, where it is immediately turned to vapor by the heat of the parts with which it comes into contact, and the vapor passes through the passages 6, 6, to the grooves, and is ignited easily by introducing a lighted splint into the space between the sleeves now filled by the rising mixture of vapor and air. Thereafter the burner continues to burn steadily on the regular fuel. The priming fluid is easily directed into the large and accessible cup-shaped portion of the heat-transmitting member without spilling, and no explosion hazard is created.

A marked advantage of the burner of our invention, resulting from the described improvements in design and operation, is that it will work with fuels of higher specific gravity, and of cheaper cost, than will the burners of like type hitherto in use. This feature adds to the utility of the burner, gives a range of choice of fuels where several grades are available, and enables its use in localities where kerosene is not to be had but heavier hydrocarbons are obtainable. The heavier fuels are richer in heat units and the efficient vaporizing ability of the present burner enables it to handle them and maintain a steady and intensely hot combustion. The increased residues are collected in a place where they will not interfere with prolonged operation and from whence they may be readily removed, whereas the old organizations either cannot be started to operating on heavy hydrocarbons or, if lighted, then through insufficient vaporizing in the grooves to support sustained combustion they lose headway and go out, or speedily clog up with residue and give unsatisfactory service.

Reference has been made to the commercial value of a design that facilitates cleaning of residue at all times with ease and simplicity. While, in general, the nature of the fuel used is such that the vapor-conducting conduits 6, 6 remain clean during long use, still the choking of these ducts by deposit of residue therein through poor fuel or improper operation must be guarded against to maintain efficiency of the burner at all times. This is one purpose of the radial, horizontal vapor conduits leading from the vaporizing chamber straight through the inner groove 3 to the outer groove 4. The entire length of these conduits is thus accessible to a cleaning tool inserted from the inner or open end. To insure that the outer ends of the vapor conduits may adequately be cleaned the diameter of the vaporizing chamber 5 is purposely made at least equal to the length of a conduit 6, 6. This permits a conduit cleaner of ample length to be introduced within the vaporizing chamber and to be manipulated efficiently for cleaning the conduit from end to end whenever necessary.

While our burner, as illustrated, is of circular form, this being the most satisfactory type to manufacture, the advantages herein set forth will be secured if the principles of operation are utilized with other geometrical forms.

Thus by our invention is produced an improved fuel oil burner suited to use in domestic ranges and in other connections, having valuable practical advantages over prior devices of the same sort.

The nature and scope of the invention having been indicated and its preferred embodiment having been specifically described, what is claimed as new, is:—

1. A fuel oil burner embodying a base having a central vaporizing chamber and vapor distributing conduits connected therewith, two annular combustion chambers, one within the other, surrounding said vaporizing chamber and in communication therewith through said conduits, each combustion chamber having a pair of perforated cylindrical walls, and covers comprising a circular and an annular plate, the circular plate resting on the upper edge of the inner wall of the inner combustion chamber and the annular plate resting on the upper edges of the outer wall of the inner combustion chamber and the inner wall of the outer combustion chamber and said annular plate having radial spacing lugs to engage the top edge of the outer wall of the outer combustion chamber.

2. A fuel oil burner comprising, in combination with a source of liquid fuel supply, a base having a horizontally arranged endless vapor-distributing groove underlying a combustion chamber, a cup-shaped vaporizing chamber, associated with said combustion chamber and deriving heat therefrom to convert liquid fuel within the vaporizing chamber into vapor, having a pipe from the fuel source connected to its bottom from below and said bottom being in a plane below the level of the bottom of said groove, and vapor-conducting conduits connecting the bottom of said groove with the vaporizing chamber, said connection with the vaporizing chamber being through the wall thereof at a level substantially above the bottom thereof.

3. An oil burner comprising, in combination with a source of liquid fuel supply, a base having a plurality of horizontally arranged concentric lipped vapor-distributing grooves, a pair of spaced perforated walls supported by the lips of each groove to form a combustion chamber and a central heating chamber, a cup-shaped vaporizing chamber within said central heating chamber and connected to said groove by inner horizontal vapor conduits having their bottoms substantially at the level of the bottom of said groove at their outer ends but substantially above the bottom of said vaporizing chamber at their inner ends, outer horizontal vapor conduits between the grooves for connecting one with the other, the bottom of said vaporizing chamber being substantially below the level of the bottoms of said grooves, and a pipe from the fuel source, wholly outside the burner, connected to an opening in said vaporizing chamber.

4. An oil burner comprising inner and outer concentric combustion chambers each comprising a horizontal bottom vapor groove with vertical walls rising from the edges thereof, a cup-shaped vaporizing chamber centralized with respect to said grooves having its bottom at a lower level than the bottoms of said grooves, said vaporizing chamber being connected to said grooves by a plurality of radial tubular members forming vapor conduits communicating with the vaporizing chamber at their inner ends substantially above the level of the bottom of said chamber and communicating with the bottoms of both grooves at their outer ends, and a pipe for supplying liquid fuel to be vaporized connected to the vaporizing chamber below the level of the bottoms of said vapor conduits and out of the path of the products of combustion.

5. In a fuel oil burner, a combustion chamber having an endless, bottom vapor-groove, a vaporizing chamber adjacent said groove and communicating with said vapor-groove, a fuel supply pipe connected to the bottom of said vaporizing chamber, and means above the vaporizing chamber for retaining a quantity of highly volatile priming fuel while being consumed and also provided with a small bottom port in alinement with said supply pipe to permit discharge of priming fuel into the supply pipe for mixture with the ordinary fuel supplied through said pipe.

6. A fuel oil burner embodying an integral base comprising a pair of concentric lipped vapor grooves, a central vaporizing chamber and vapor-distributing conduits leading outward from said chamber communicating with both grooves, a pair of spaced perforated walls supported by the lips of each groove to form a combustion chamber thereabove, the inner wall forming a central heating chamber within which the vaporizing chamber is located, a solid metal cover closing the central heating chamber, a cup-shaped metal cover closing the vaporizing chamber having its wall extending upward within the central heating chamber toward the metal cover thereof and in proximity to the surrounding wall of the inner combustion chamber, and means for supplying liquid fuel to the vaporizing chamber.

7. In an oil burner of the type in which liquid fuel is vaporized and the vapor conducted to vapor distributing grooves underlying combustion chambers, inner and outer concentric vapor-distributing grooves, a central vaporizing chamber in the form of a cup having a diameter at least equal to the length of the vapor-conducting conduits from said cup to the outer groove, a plurality of inner vapor-conducting conduits extending radially from the wall of said cup to the inner groove, and outer vapor-conducting conduits connecting the two grooves, said inner and outer conduits being in pairs and in alinement to form a direct vapor passage from the cup to the outer groove.

8. A fuel oil burner embodying a base having an inner vaporizing chamber from which the vapor may radiate, a cover of heat conducting material for said vaporizing chamber and being removable therefrom to facilitate cleaning the underlying chamber, a surrounding annular combustion chamber to which said vapor radiates, said combustion chamber being composed of an annular bottom and outside and inside perforated sheet metal cylinders the latter forming a central heating chamber within which said vaporizing chamber is located, a cover on the central heating chamber for absorbing heat from the combustion chamber and reflecting it downward upon the cover of said vaporizing chamber, and a fuel supply pipe connected to the vaporizing chamber below the cover thereof and out of the path of the products of combustion.

9. An oil burner having in combination a base providing inner and outer concentric rings having grooves, a central cup-shaped vaporizing chamber having a radius greater than one-half the radial distance from the inside of the wall of the chamber to a point midway between the inner and outer grooves and having outlet openings in its sides, vapor-conducting conduits leading from said outlet openings to the inner groove and to the outer groove, perforated sheet metal walls supported at the edges of said grooves to form vertical annular combustion chambers above said grooves and vertical air spaces between said grooves and within the inner wall, said base having openings through which air is delivered to said air spaces, covers over said air spaces, a cover over the vaporizing chamber and an oil supply pipe connected to said vaporizing chamber below the cover thereof and located out of the path of the products of combustion, whereby the oil may spread out in said chamber and substantially all of the oil in normal operation may be converted into vapor and solid residue in said chamber.

10. An oil burner having in combination a base providing inner and outer concentric rings having grooves, a central cup-shaped vaporizing chamber having a radius greater than one-half the radial distance from the inside of the wall of the chamber to the outer groove and having outlet openings in its sides and an inlet opening in its bottom, vapor-conducting conduits leading from said outlet openings to the inner groove and to the outer groove, a removable cover for said vaporizing chamber, perforated sheet metal walls supported at the edges of said grooves to form vertical annular combustion chambers above said grooves and vertical air spaces between said grooves and within the inner wall, said base having openings through which air is delivered to said air spaces, covers over said air spaces, and an oil supply pipe connected to the inlet opening in said vaporizing chamber whereby the oil may spread out over the bottom of said chamber and substantially all of the oil in normal operation may be converted into vapor and solid residue in said chamber.

11. An oil burner having pairs of spaced, concentric perforated metal sleeves forming spaced inner and outer combustion chambers with an intermediate air chamber and a central air chamber enclosed by the inner sleeve, a base forming concentric, spaced vapor receiving channels underlying and communicating each with one of said combustion chambers, a vaporizing chamber within the inner vapor receiving channel having a flat bottom and provided with a side port communicating with said inner channel through which vapor may radiate, vapor conducting passages connecting said inner and outer channels, an oil supply pipe connected to the vaporizing chamber through its bottom, a cover for said vaporizing chamber, and a cover for the central air chamber, said covers being each removable to clean the vaporizing chamber.

12. A fuel oil burner embodying an integral base comprising a central shallow vaporizing chamber from which vapor may radiate to annular combustion chambers and annular portions forming the bottoms of said combustion chambers, pairs of spaced perforated sheet metal cylinders forming said combustion chambers above said bottoms, the inner cylinder forming a central heating chamber within which the vaporizing chamber is located, a metal cover for the central heating chamber, means for conducting heat from said central heating chamber to said vaporizing chamber including a metal cover for the vaporizing chamber and a heat conducting member extending upward from said cover and within the central heating chamber toward the metal cover thereof to absorb heat from the surrounding wall of the inner combustion chamber, and an oil supply pipe connected to said vaporizing chamber below the cover thereof.

13. A fuel oil burner according to claim 12 in which said means for conducting heat to the vaporizing chamber includes also a heat conducting member below the vaporizing chamber cover and depending therefrom into said chamber.

LAWRENCE E. JOHNSON.
ERNEST C. LEACH.